US012523867B2

(12) United States Patent
Delame-Quentin

(10) Patent No.: US 12,523,867 B2
(45) Date of Patent: Jan. 13, 2026

(54) PROTECTIVE SEAL

(71) Applicant: LATELEC, Toulouse (FR)

(72) Inventor: Cyrille Delame-Quentin, Toutens (FR)

(73) Assignee: LATELEC, Toulouse (FR)

( * ) Notice: Subject to any disclaimer, the term of this patent is extended or adjusted under 35 U.S.C. 154(b) by 675 days.

(21) Appl. No.: 17/780,965

(22) PCT Filed: Dec. 18, 2020

(86) PCT No.: PCT/EP2020/087047
§ 371 (c)(1),
(2) Date: May 27, 2022

(87) PCT Pub. No.: WO2021/123187
PCT Pub. Date: Jun. 24, 2021

(65) Prior Publication Data

US 2023/0003999 A1 Jan. 5, 2023

(30) Foreign Application Priority Data

Dec. 19, 2019 (FR) ....................................... 1914822

(51) Int. Cl.

| | |
|---|---|
| ***B65D 53/06*** | (2006.01) |
| ***B65D 6/00*** | (2006.01) |
| ***B65D 85/38*** | (2006.01) |
| ***G02B 27/00*** | (2006.01) |

(52) U.S. Cl.
CPC .......... *G02B 27/0006* (2013.01); *B65D 11/10* (2013.01); *B65D 53/06* (2013.01); *B65D 85/38* (2013.01); *B65D 2251/20* (2013.01)

(58) Field of Classification Search
CPC .... B65D 53/04; B65D 53/06; B65D 2251/20; B65D 2251/205; B65D 39/04
USPC .......................................... 206/316; 215/233
See application file for complete search history.

(56) References Cited

U.S. PATENT DOCUMENTS

| | | | | |
|---|---|---|---|---|
| 6,223,937 B1 * | 5/2001 | Schmidt | ................ | B65D 47/06 222/54 |
| 2009/0109424 A1 | 4/2009 | Burnett et al. | | |

FOREIGN PATENT DOCUMENTS

| | | | | |
|---|---|---|---|---|
| EP | 2574271 A1 | 4/2013 | | |
| KR | 20140140471 A * | 12/2014 | ............ | B65D 53/04 |
| WO | 2006088858 A2 | 8/2006 | | |

* cited by examiner

*Primary Examiner* — Anthony D Stashick
*Assistant Examiner* — Raven Collins
(74) *Attorney, Agent, or Firm* — H&I PARTNERS; Chai Im; C. Andrew Im

(57) ABSTRACT

A protective seal taking the form of a hollow body includes a first wall, a second wall opposite the first wall, and a section between the first wall and the second wall. The first wall has an opening and the second wall has at least one slot. The protective seal is configured so as to pass, when a force is exerted on the second wall, in a direction perpendicular to the second wall, from a rest position to a stressed position. In the rest position, at least one slot is closed. In a stressed position, at least one slot is deformed, freeing up an opening in the second wall.

5 Claims, 3 Drawing Sheets

PROTECTIVE SEAL

RELATED APPLICATIONS

This application is a 371 application of PCT/EP2020/087047 filed Dec. 18, 2020, which claims priority from French Patent Application No. 1914822 filed Dec. 19, 2019, each of which is incorporated herein by reference in its entirety.

TECHNICAL FIELD OF THE INVENTION

The invention relates to a protective seal.

The invention is in particular intended to protect elements from dust, in particular when they are unused. It applies more particularly, although non-limitatively, to the protection of optical elements.

BACKGROUND OF THE INVENTION

Optical elements, such as for example lenses, objectives in an optical instrument (camera, telescope, microscope), light sources, photodetectors, are elements very sensitive to dust and other impurities.

In general, these elements, when they are not in use, are placed in hermetic boxes or protected by removable rigid protective caps. These protective caps are intended to be removed before use. However, during the time taken for removing the protective cap and installing the optical element in a position of use, these optical elements may once again be subjected to dust. Moreover, the protective caps may be lost or forgotten.

OBJECT AND SUMMARY OF THE INVENTION

The present invention aims to remedy the aforementioned drawbacks.

For this purpose, the present invention proposes a protective seal taking the form of a hollow body comprising a first wall, a second wall opposite to the first wall, and a section between the first wall and the second wall. The first wall includes an opening. The second wall includes at least one slot. The protective seal is configured so as to pass, when a force is exerted on the second wall, in a direction perpendicular to said second wall, from a rest position, in which the at least one slot is closed, to a stressed position, in which the at least one slot is deformed, freeing up an orifice in the second wall.

The first wall preferably has a generally planar shape. The second wall has a generally planar shape.

Generally planar or substantially planar shape means preferentially a wall having a constant thickness.

The first wall is advantageously intended to come to be positioned against a support of an element that it is wished to protect from dust. The first wall is advantageously intended to be arranged so that the element to be protected is disposed facing or in the opening in the first wall.

Thus, when the protective seal is positioned around the element, it acts, when it is in a rest position, as a protective cap with respect to dust. The second wall of the protective seal being closed off when it is in a rest position, the protective seal becomes hermetic to the introduction of dust through this second wall. The hollow body forming the protective seal thus delimits a dust-tight chamber.

By a simple application of a force, in a direction perpendicular to the second wall, the second wall stretches in its plane, which deforms the at least one slot and creates an orifice in the second wall.

Thus, when the protective seal is positioned around the element and in a stressed position, the protective seal no longer acts as a protective cap and the element can be used.

The force can be applied for example manually or by a mechanical action.

The purpose of such a protective seal is advantageously to remain in place around the element, even when the latter is being used.

Such a protective seal is advantageously intended to protect optical elements, such as lenses, light sources or photodetectors. This protective seal can also be intended to protect non-optical elements, such as for example inkjet nozzles.

In particular embodiments, the invention furthermore complies with the following characteristics, implemented separately or in each of the technically operative combinations thereof.

In particular embodiments of the invention, the hollow body forming the protective seal is produced from an elastic material.

In a preferred example embodiment, the elastic material is an elastomer. Such a material made from elastomer is advantageous since it enables the protective seal to deform elastically, while remaining in the elastic domain.

In other example embodiments, the elastic material may be a silicone, a composite material or a metallic material. Any other type of material capable of deforming while remaining in the elastic domain can be used.

In particular embodiments of the invention, said protective seal is configured to return to the rest position when the force is no longer being exerted on the second wall. Thus, as soon as the element is no longer being used, the force on the second wall is removed, the second wall reverts to its initial shape, with its at least one slot closed again, and the protective seal once again becomes naturally hermetic to dust.

In particular embodiments of the invention, the section has the form of a truncated cone, with a small base on the same side as the first wall and a large base on the same side as the second wall. Such a form of the section makes it possible, when a force is exerted on the protective seal, to advantageously contribute to the stretching of the second wall in its plane.

In particular embodiments of the invention, the second wall of the protective seal can include at least two slots, preferably crossed. Thus, when the protective seal is in a stressed position, the orifice created by the deformation of the two slots has dimensions greater than that of the orifice created by the deformation of a single slot.

The invention also relates to a protective assembly including two protective seals as disclosed and in accordance with at least one of its embodiments. The respective second walls of the two protective seals are advantageously arranged to come into contact against each other. Each protective seal is intended to protect an element. The two elements protected respectively by a protective seal are intended to interact together.

Such a protective assembly makes it possible, when the two protective seals are put in contact and subjected to a force exerted perpendicular to the two walls, to create, between said two elements, a protected space, delimited by the sections of the two protective seals and free from dust. Thus, even during use, the elements are protected by the protective seals.

The protective assembly thus advantageously makes it possible to protect two elements, both before and after use thereof and during use thereof.

BRIEF DESCRIPTION OF THE FIGURES

The invention will be understood better from the reading of the following description, given by way of in no way limitative example, and made with reference to the following figures.

In these figures, numerical references that are identical from one figure to another designate identical or similar elements. Moreover, for reasons of clarity, the drawings are not to scale, unless mentioned to the contrary.

DESCRIPTION OF EMBODIMENTS

The present invention relates to a protective seal 70. FIGS. 1 to 4 show a first embodiment of the protective seal 70 and FIGS. 5 and 6 show a second embodiment of said protective seal 70.

The invention is described in the particular context of one of its preferred fields of application in which the protective seal 70 is intended to protect at least one optical element. In the first embodiment, the protective seal 70, independently of its form, is intended to protect a single optical element. In the second embodiment, the protective seal 70, independently of its form, is intended to protect a plurality of optical elements. The protective seal 70 is configured to have dimensions adapted to the protection of a predefined number of optical elements.

Figure 5:
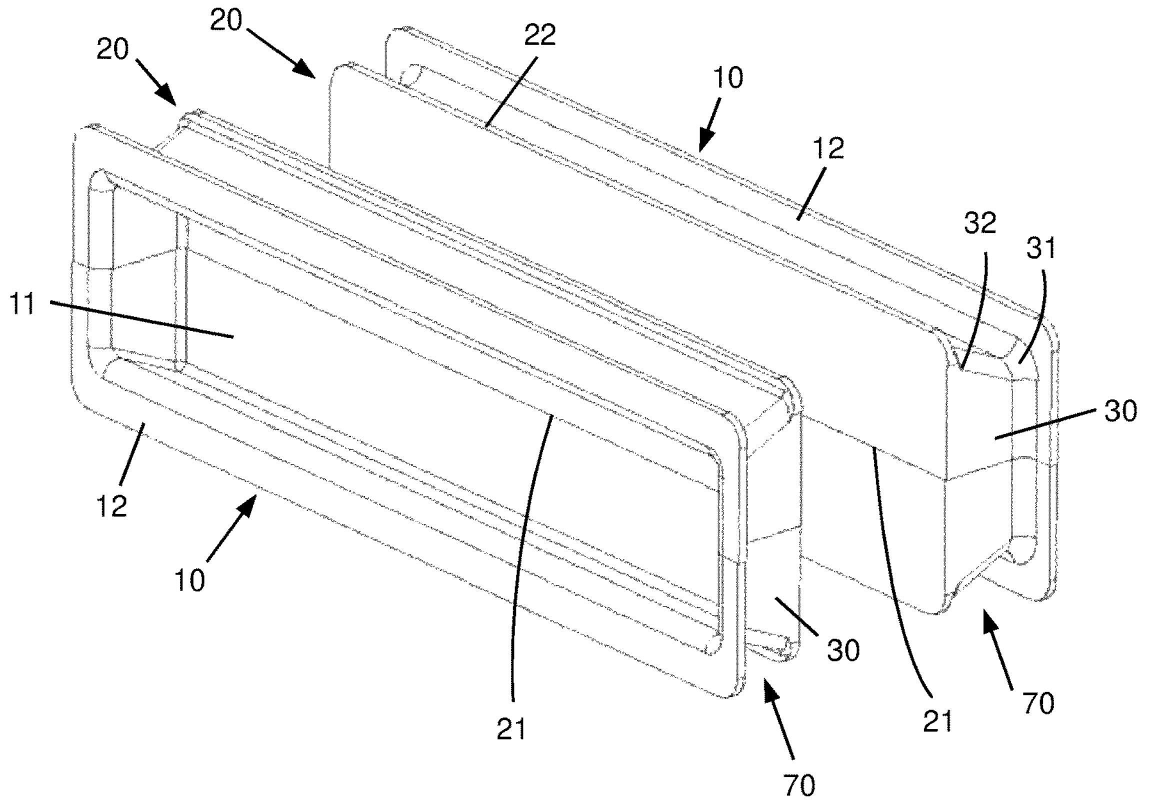
FIG. 5 illustrates another example of a protective assembly including two protective seals according to a second embodiment of the invention, and sized for protecting a plurality of elements; the protective seals being shown facing and in the rest position.
Figure 6:
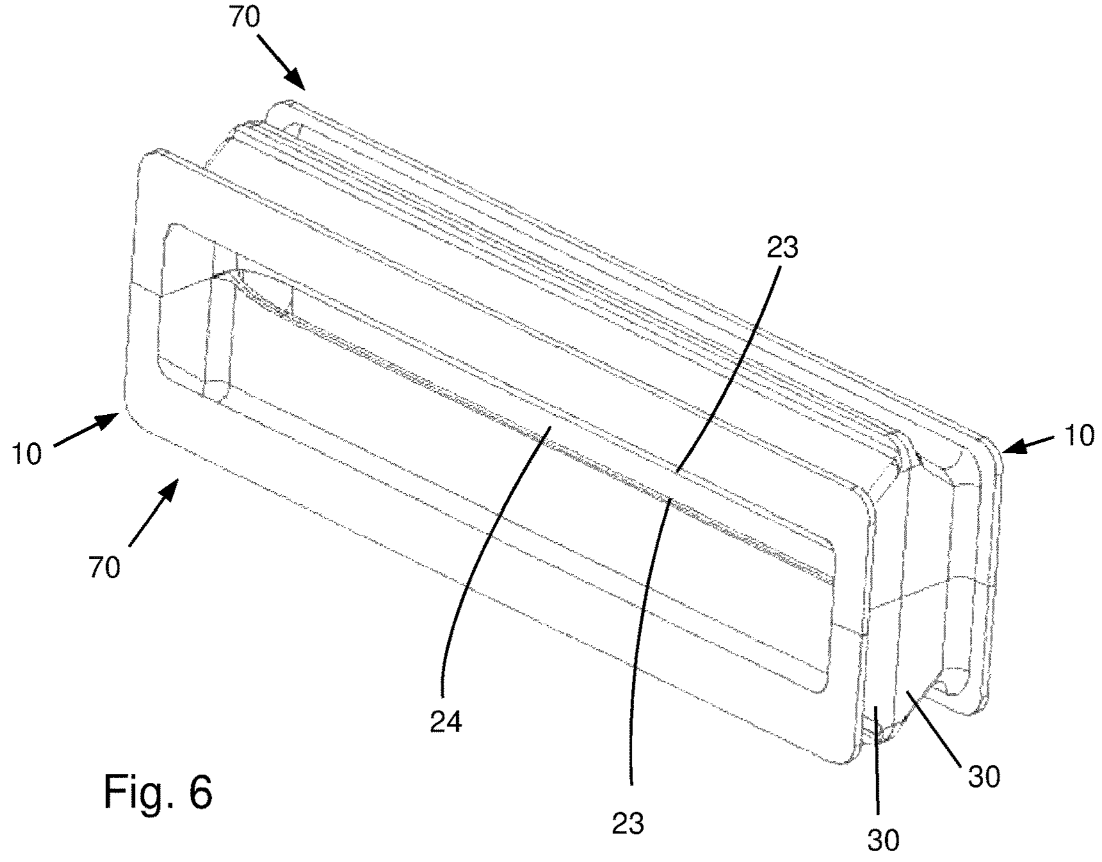
FIG. 6 illustrates the protective assembly of FIG. 5, with the protective seals assembled and in a stressed position.

In the example in FIGS. 5 and 6, the protective seal is sized to protect a plurality of optical elements, such as for example lenses, light sources or photodiodes, preferably arranged in a column.

The protective seal 70 is in the form of a hollow body. The hollow body includes:

- a first wall 10,
- a second wall 20,
- a section 30 connecting the first wall 10 and the second wall 20.

The first wall 10 advantageously has a substantially generally planar shape. The first wall preferentially includes a first planar surface. Said first planar surface is located on the side opposite to the section 30.

The first wall 10 includes an opening 11. The opening 11 is preferably delimited by a collar 12.

Figure 3:
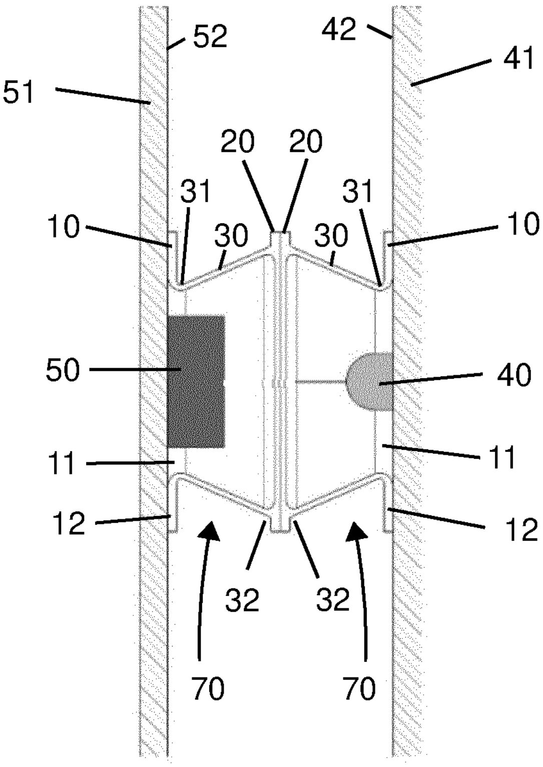
FIG. 3 shows, in cross section, a protective assembly including two protective seals of FIG. 1, the protective seals being in a rest position.

The collar 12 is preferentially intended to be disposed against a bearing face of a support of the optical element to be protected so that the optical element is disposed facing the opening 11 or in the opening 11 of the first wall 10, as illustrated on FIG. 3. In other words, the first surface of the first wall 10 is intended to be disposed against the bearing face of the support of the optical element.

Figure 1:
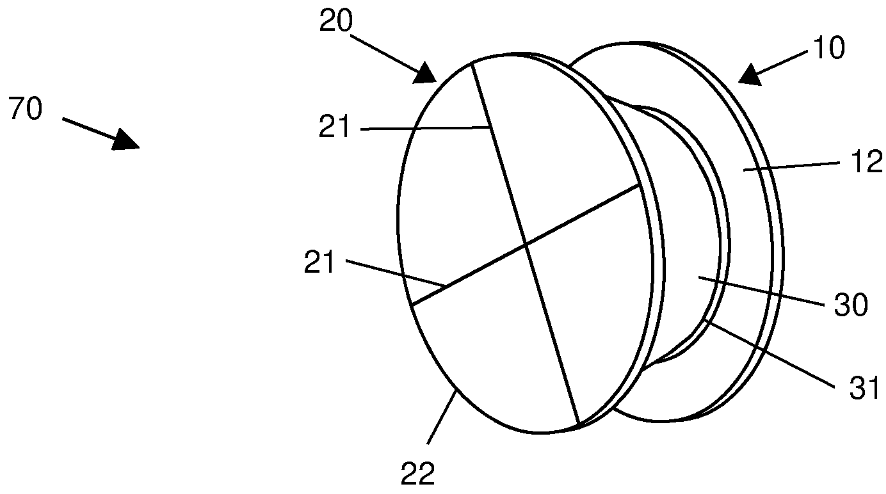
FIG. 1 illustrates a protective seal according to a first embodiment of the invention, in a rest position.
Figure 2:
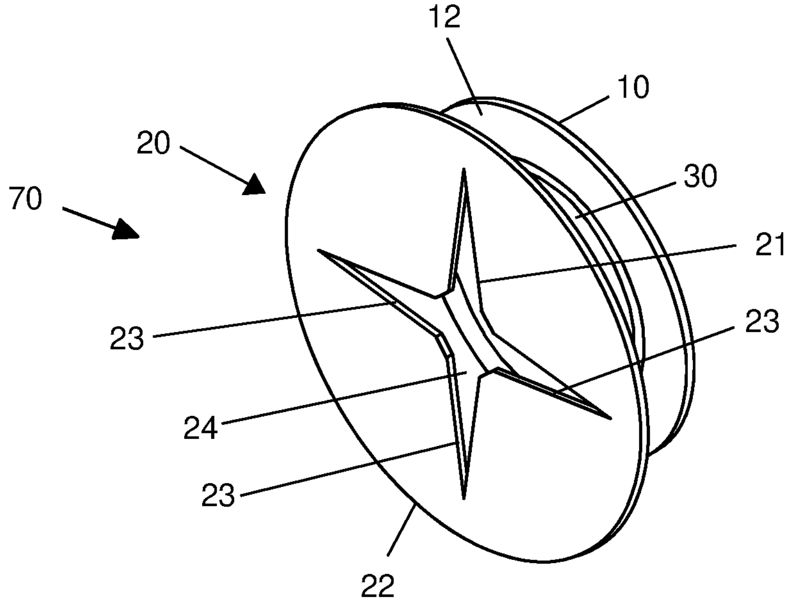
FIG. 2 illustrates the protective seal of FIG. 1, in a stressed position.

In the first embodiment of the protective seal 70, as illustrated on FIGS. 1 and 2, the first wall 10 has a circular cross section. Thus the opening 11 has a circular cross section and the collar 12 an annular cross section.

In the second embodiment of the protective seal 70, as illustrated on FIG. 5, the first wall 10 has a rectangular cross section. Thus, the opening 11 is a rectangular opening and the collar 12 is in the form of a ring with a rectangular shape.

The second wall 20 is opposite to the first wall 10.

The second wall 20 advantageously has a substantially generally planar shape.

The first wall preferentially includes a first planar surface. Said first planar surface is located on the side opposite to the section 30.

The second wall 20 preferably has a cross section with a shape identical to the shape of the cross section of the first wall 10.

Thus, in the first embodiment of the protective seal 70, the second wall 20 has a circular cross section. In the second embodiment of said protective seal 70, the second wall 20 has a rectangular cross section.

Whatever the embodiment of the protective seal 70, the second wall 20 includes at least one slot 21. The at least one slot 21 is through in the thickness of the second wall 20.

In a non-limitative example embodiment illustrated on FIGS. 1 and 2, the second wall 20 includes two slots 21.

In another non-limitative example embodiment, illustrated on FIG. 5, the second wall 20 includes one slot 21.

Although the slots 21 are illustrated on FIGS. 1, 2 and 5 and described as one and two in number, the number of these slots 21 is not limited to those described and illustrated. Thus it is possible, without departing from the scope of the invention, to produce a second wall with three or four slots or more.

Advantageously, when the second wall 20 has a circular cross section, as illustrated in FIGS. 1 and 2, the slots 21 of the second wall 20 are preferentially radial slots.

In a non-limitative embodiment of the radial slots, each slot 21 extends radially as far as a peripheral rim 22 of the second wall, as illustrated on FIG. 1. The two radial slots 21 divide the second wall 20 into equally four.

Advantageously, when the second wall 20 has a rectangular cross section, as illustrated on FIG. 5, the slot 21 is preferentially a longitudinal slot.

In a non-limitative embodiment of the longitudinal slot, the slot 21 extends radially as far as a peripheral rim 22 of the second wall. The longitudinal slot 21 divides the second wall 20 equally into two.

The section 30, connecting the first wall 10 and the second wall 20, delimits a hollow internal space. In other words, the protective seal 70, formed by the first wall 10, the second wall and the section 30, has a single hollow internal space.

In one embodiment, the section 30 has, whatever its form, a mid-axis oriented substantially perpendicular to the first wall 10 or to the second wall 20.

The section 30 advantageously has a form substantially in a truncated cone, with a small base 31 on the same side as the first wall 10 and a large base 32 on the same side as the second wall 20.

A form substantially in a truncated cone means a form with a decreasing or increasing monotonic cross section, here decreasing from the second wall 20 towards the first wall 10.

The expression "truncated cone" used to describe the form of the section 30 is to be taken in the general sense encompassing any cross-sectional form of the truncated cone, such as for example an elliptical, circular, square, rectangular or polygonal cross section.

The section 30 preferably has a cross-sectional form substantially identical to the cross-sectional form of the first wall 10 or of the second wall 20.

The truncated cone example of the section 30 is illustrated and described in the case of a truncated cone with a circular cross section for the first embodiment, illustrated on FIGS. 1 to 4.

The truncated cone example of the section 30 is illustrated and described in the case of a truncated cone with a rectangular cross section for the second embodiment, illustrated on FIGS. 5 and 6.

The section 30 is open at the small base 31 and at the large base 32.

The section 30 is arranged so that the small base 31 is disposed around the opening 11 in the first wall 10.

Preferably, as illustrated on FIG. 3, the cross section of the small base 31 of the section 30 corresponds to the cross section of the opening 11 in the first wall 10.

Preferably, as illustrated on FIG. 3, the cross section of the small base 32 of the section 30 corresponds substantially to the cross section of the second wall 20.

Preferably, the hollow body, i.e. the first wall 10, the second wall 20 and the section 30, is produced in a single one-piece part.

The hollow body is advantageously produced from an elastic material.

In an example embodiment, the hollow body is made from elastomer material, such as for example a material based on silicone or rubber.

This type of material advantageously has the property of deforming greatly while remaining in the elastic domain.

Any type of material capable of deforming, while remaining in the elastic domain, can be used for producing the hollow body.

According to the invention, the protective seal 70 can adopt at least two positions.

In a first position, referred to as the rest position, the protective seal 70 is configured so that the at least one slot 21 of the second wall 20 is closed.

Closed slot means that longitudinal edges 23 of the at least one slot 21 are contiguous, so that said second wall 20 is closed off. No dust or impurity can pass through the second wall 20, via the at least one slot 21, towards the section 30.

In a second position, referred to as the stressed position, the protective seal 70 is configured so that the at least one slot 21 of the second wall 20 is deformed.

Deformed slot means that the longitudinal edges 23 of the slot are no longer joined.

The second wall 20 then has an orifice 24 delimited by the longitudinal edges 23 of the at least one slot.

The protective seal passes from the rest position to the stressed position when a force is exerted on the protective seal. This force is preferentially exerted in a direction substantially perpendicular to the second wall 20. The force can be exerted in both directions of the axis, without this being restrictive of the invention.

When a force is exerted on the protective seal, the second wall 20, through its elasticity, stretches in its plane, thus causing the deformation of the at least one slot and its opening thereof. The truncated cone form of the section, with the large base 32 on the same side as the second wall, advantageously contributes to the stretching of the second wall in its plane.

The selection of the hardness of the material constituting the body of the protective seal is preferentially dependent on the force exerted on the second wall 20.

The protective seal undergoes a deformation that remains in its elastic domain.

Thus, as soon as the force exerted on the protective seal ceases, the second wall 20 advantageously by itself resumes its rest position.

The protective seal 70 can advantageously be used with another protective seal to form a protective assembly.

Figure 4:
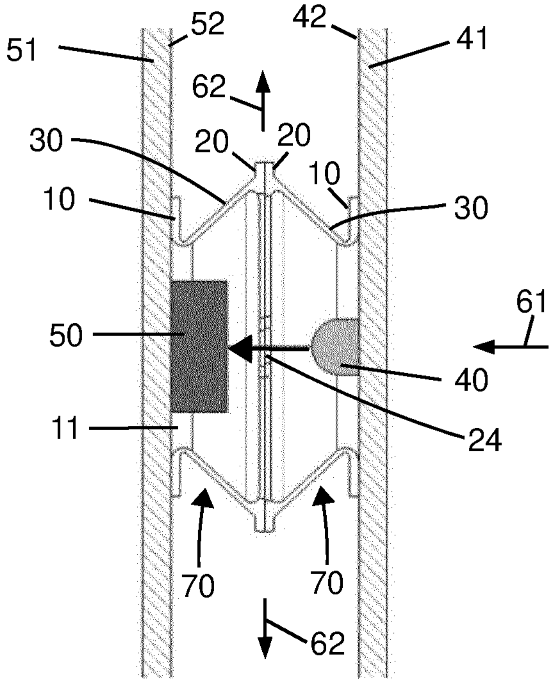
FIG. 4 illustrates, in cross section, the protective assembly of FIG. 3, with the protective seals in a stressed position.

FIGS. 3 and 4 illustrate a preferred method of use of such a protective assembly.

In this non-limitative embodiment, each protective seal of the protective assembly is sized to protect an element, here optical.

A protective seal, referred to as the first protective seal, is intended to protect for example a light source 40.

A protective seal referred to as the second protective seal is intended to protect for example a photodetector 50.

The photodetector 50 is intended to be arranged facing the light source so as to receive a light beam coming from the light source 40.

The first protective seal is positioned facing the light source 40 so that said light source 40 is disposed level with the opening 11 in the first wall 10. The collar 12 of the first wall 10 is disposed against a bearing face 42 of a support 41 of the light source 40. The first protective seal is attached reversibly, or non-reversibly, to the support 41 of the light source 40, by the collar 12 of its first wall 10.

In an equivalent manner, the second protective seal is positioned facing the photodetector 50 so that said photoreceptor is disposed at the opening 11 of the first wall 10 of said second protective seal. The collar 12 of the first wall 10 is disposed against a bearing face 52 of a support 51 of the photodetector 50. The second protective seal is attached reversibly, or non-reversibly, to the support 51 of the photodetector 50, by the collar 12 of its first wall 10.

When the light source 40 is not being used, the first protective seal is in the rest position. The first protective seal is then hermetic to dust. No dust can enter the hollow body. The light source 40 is thus protected from dust and other impurities.

Likewise, when the photodetector 50 is not being used, the second protective seal is in the rest position. The second protective seal is then dust-tight and no dust can enter the hollow body. The photodetector 50 is thus protected from dust and other impurities.

When it is wished to establish an optical connection between the light source 40 and the photodetector 50, the light source 40 and the photodetector 50 are disposed facing each other. The second wall 20 of the first protective seal is arranged opposite the second wall 20 of the second protective seal. In other words, the first surface of the second wall of the first protective seal is arranged opposite the first surface of the second wall of the second protective seal.

As shown on FIG. 3, the second wall 20 of the first protective seal is against the second wall 20 of the second protective seal. Each protective seal is in the rest position. No force is exerted on either of the protective seals. The optical beam that would be emitted by the light source 40 cannot then pass through the second wall 20 of the first protective seal. The photodetector 50 cannot receive the optical beam emitted by the light source 40. In one example embodiment, the light source and the photodetector are distant from each other by a few centimetres, for example a maximum of 5 cm. Each protective seal is sized accordingly.

As illustrated on FIG. 4, a force is now exerted on the protective seals. This force is represented by the arrow 61, by way of non-limitative example. This force is applied in a direction substantially perpendicular to the second walls of each protective seal.

When this force is exerted, said second walls of each protective seal stretch in their plane, as illustrated by the two arrows 62. In stretching, the slots of said second walls of each protective seal open and leave clear an orifice 24 in said second walls. Said respective orifices 24 of each second wall then allows the passage of the optical beam emitted by the light source 40 in the direction of the photodetector 50.

Such a protective assembly has a dual advantage. When the light source 40 and the photodetector 50 are not being used, each protective seal protects its optical element from dust, independently of the other. When the two protective seals are put in contact and a force is exerted on them, the optical connection is achieved in the hollow space of each protective seal. No dust can enter inside the protective seals. The protective assembly thus advantageously makes it possible to protect two optical elements, both before and after uses thereof and during uses thereof.

FIGS. 5 and 6 illustrate another example of a protective assembly.

In this example, each protective seal is sized to protect a plurality of optical elements (not shown) arranged in a column. A first protective seal is for example intended to protect a plurality of light sources. A second protective seal is for example intended to protect a plurality of photodetectors.

FIG. 5 shows the two protective seals in the rest position. The second walls of the two protective seals are disposed facing each other. The longitudinal slot of each second wall is closed.

FIG. 6 shows the two protective seals assembled and in the stressed position. The two walls of the two protective seals are one against the other. More precisely, the first surface of the second wall of the first protective seal is against the first surface of the second wall of the second protective seal. In this figure the opening of the longitudinal slots of each second wall can be seen clearly, leaving clear an orifice 24 in each second wall allowing passage of optical beams emitted by the light sources towards the associated photodetectors.

The present invention is not limited to a protective seal with a first wall 10, a section 30 and a second wall 20 with the same cross section, as illustrated on the figures. A protective seal may include a first wall 10, a section 30 and a second wall 20 with different cross sections. For example, a protective seal may include a first wall 10 having a circular cross section, a second wall 20 having a square cross section and a section 30 in the form of a truncated cone of elliptical cross section.

Likewise, the present invention is not limited to a protective assembly including two identical protective seals, as illustrated on FIGS. 3 and 4. The protective seals forming the protective assembly may be different. A person skilled in the art is in a position to adapt the invention to forms and arrangements that are not described.

The invention claimed is:

1. A protective seal taking a form of a hollow body comprising:

- a first wall of substantially planar shape and having a constant thickness, the first wall comprising an opening delimited by a collar;
- a second wall of substantially planar shape, having a constant thickness, and opposite to the first wall, the second wall comprising at least one slot;
- a section, between the first wall and the second wall, in a form of a truncated cone, with a small base on a same side as the first wall and a large base on a same side as the second wall, the section comprising a decreasing monotonic cross section from the second wall towards the first wall; and
- the protective seal being configured so as to pass, when a force is exerted on the second wall through the first wall, in a direction perpendicular to the second wall, from a rest position, in which said at least one slot is closed such that the protective seal is hermetic to dust, to a stressed position, in which the second wall is stretched in its plane, deforming said at least one slot, and freeing up an orifice in the second wall, the section in the form of the truncated cone contributing to the stretching of the second wall in its plane.

2. The protective seal of claim 1, wherein the hollow body is produced from an elastic material.

3. The protective seal of claim 1, wherein said protective seal is configured to return to the rest position when the force is no longer being exerted on the second wall, such that the protective seal is again hermetic to dust.

4. The protective seal of claim 1, wherein the second wall comprises two crossed slots.

5. A protective assembly comprising two protective seals of claim 1, the second wall of each of said two protective seals being arranged to come into contact against each other.

* * * * *